(12) United States Patent
Weber et al.

(10) Patent No.: US 9,358,648 B2
(45) Date of Patent: Jun. 7, 2016

(54) PROCESSING APPARATUS AND METHOD OF OPERATING A PROCESSING APPARATUS

(75) Inventors: Joachim Weber, Bad Ditzenbach (DE);
Steffen Osswald, Geislingen (DE);
Stefan Drexler, Bad Überkingen/Hausen (DE); Joachim Schulz, Deggingen (DE)

(73) Assignee: HINTERKOPF GMBH, Eislingen (DE)

( * ) Notice: Subject to any disclaimer, the term of this patent is extended or adjusted under 35 U.S.C. 154(b) by 762 days.

(21) Appl. No.: 13/610,026

(22) Filed: Sep. 11, 2012

(65) Prior Publication Data
US 2013/0074317 A1      Mar. 28, 2013

(30) Foreign Application Priority Data

Sep. 28, 2011   (EP) .................................... 11007853

(51) Int. Cl.
*B23P 21/00*   (2006.01)
*B23Q 39/04*   (2006.01)
*B21D 43/02*   (2006.01)
*B21D 43/14*   (2006.01)
*B21D 51/26*   (2006.01)

(52) U.S. Cl.
CPC ............. *B23P 21/006* (2013.01); *B21D 43/028* (2013.01); *B21D 43/14* (2013.01); *B21D 51/2692* (2013.01); *B23Q 39/046* (2013.01); *Y10T 29/49998* (2015.01); *Y10T 29/519* (2015.01); *Y10T 29/5127* (2015.01); *Y10T 29/5129* (2015.01)

(58) Field of Classification Search
CPC .... B23Q 39/04; B23Q 39/042; B23Q 39/046; B23P 21/006; B21D 51/00; B21D 51/2653; B21D 51/2692; Y10T 29/5127; Y10T 29/5128; Y10T 29/5129; Y10T 29/5134; Y10T 29/5185; Y10T 29/519; Y10T 29/5199; B65B 3/02; B65B 3/025; B65B 3/027
USPC . 29/33 D, 33 J, 33 T, 38 A, 38 B, 38 F, 38 R, 29/563; 53/452, 456, 470, 558
See application file for complete search history.

(56) References Cited

U.S. PATENT DOCUMENTS

| 2,484,671 A | 10/1949 | Bauman |
| 3,054,240 A | 9/1962 | Dimond |

(Continued)

FOREIGN PATENT DOCUMENTS

| WO | WO2005108278 | 11/2005 |
| WO | WO2009040325 | 4/2009 |

*Primary Examiner* — Erica E Cadugan
*Assistant Examiner* — Michael Vitale
(74) *Attorney, Agent, or Firm* — Hoffmann & Baron, LLP (57) ABSTRACT

A processing apparatus for container blanks, with a machine bed, a feed device for feeding container blanks, a discharge device for removal of container blanks, a rotatably mounted rotary worktable with several locating devices designed for conveyance of container blanks along a circular orbit section shaped conveyance path, wherein the conveyance path determines a first circle segment shaped surface section, several operating devices lying opposite the rotary worktable in the radial direction, and at least one conveyor designed for conveyance of components of container blanks and/or for container blanks along a conveyor section between a component mounting and an assigned operating device. The component mounting of the conveyor is located in a second circle segment shaped surface section, which supplements the first surface section determined by the circular orbit section shaped conveyance path to make a full circle.

17 Claims, 3 Drawing Sheets

(56) References Cited

U.S. PATENT DOCUMENTS

| | | | | |
|---|---|---|---|---|
| 4,620,359 A | * | 11/1986 | Charlton et al. | 29/557 |
| 4,629,920 A | * | 12/1986 | Hermann | 310/156.35 |
| 6,164,199 A | * | 12/2000 | Dubuit et al. | 101/38.1 |
| 6,584,895 B1 | * | 7/2003 | Strauch et al. | 101/38.1 |
| 7,163,267 B2 | * | 1/2007 | Dumenil | 347/2 |
| 2005/0046648 A1 | | 3/2005 | Dumenil | |
| 2009/0077933 A1 | * | 3/2009 | Backhaus et al. | 53/561 |
| 2010/0192517 A1 | * | 8/2010 | Schach | 53/411 |

\* cited by examiner

PROCESSING APPARATUS AND METHOD OF OPERATING A PROCESSING APPARATUS

BACKGROUND OF THE INVENTION

The invention relates to a processing apparatus for container blanks, with a machine bed, a feed device for feeding container blanks, a discharge device for removal of container blanks, a rotatably mounted rotary worktable with several locating devices designed for temporary location of container blanks and for conveyance of container blanks along a circular orbit section shaped conveyance path between the feed device and the discharge device, wherein the conveyance path determines a first circle segment shaped surface section, several operating devices lying opposite the rotary worktable in the radial direction and which are designed for the processing of container blanks located on the rotary worktable, and at least one conveyor designed for conveyance of components of container blanks and/or for container blanks along a conveyor section between a component mounting and an assigned operating device. The invention also relates to a method for the operation of a processing apparatus.

A processing apparatus according to prior art known to the applicant but not set out in writing is used to carry out one or more processing operations on container blanks. The container blanks are for example aerosol cans of metal, or tube blanks of metal or plastic, with a substantially hollow cylindrical shape. These container blanks may undergo various processing operations in the processing apparatus. A frequently undertaken processing operation is the application of a closure, in particular a screw closure, to one of the two ends of the container blank, so that the latter may in a downstream processing step, for example at a filling station, be filled with a product and then also sealed at the second end.

To carry out such processing operations, the processing apparatus includes a machine bed or base frame, to which is attached a feed device for the feeding of container blanks. The feed device is connected to an upstream conveying device, for example a conveyor belt, a chain conveyor or a magazine storage unit, over which the container blanks to be processed are conveyed from upstream processing stations to the processing unit. Also, rotatably mounted on the machine bed, is a rotary worktable, on which are mounted several locating devices for temporary location of container blanks. The container blanks are fed by the feed device from the upstream conveying device to the locating devices, being for example pushed on to them. They are then fed to the operating devices attached to the machine bed by means of a rotary step movement of the rotary worktable, which effects a pulsed circular movement of the container blanks. The desired processing operations are undertaken by the operating devices which, relative to the rotary worktable, are arranged on the outside of the machine bed in the radial direction. At the end of the circular orbit section shaped conveyance path of the container blanks held and now processed on the locating devices, the blanks are removed from the respective locating devices with the aid of a discharge device, and fed to a downstream conveying device. The downstream conveying device may also be a conveyor belt, a chain conveyor or a magazine storage unit. During the movement of the rotary worktable, the container blanks are moved on between the feed device and the discharge device on a circular orbit section shaped conveyance path, in which a surface covered by the longitudinal axes of the container blanks facing radially outwards may be regarded as the first circle segment shaped surface section. The known processing apparatus also includes at least one conveyor, which is designed for conveyance of components of and/or for container blanks along a conveyor section between a component mounting and an assigned operating device. With the aid of the conveyor, provision may be made for example for the supplying of closure components for attachment to the container blanks in the course of processing, and/or the removal of processing residues such as cut-off edge sections of the container blanks, between the component mounting and the assigned processing device.

The problem of the invention is to provide a processing apparatus and a method of operating a processing apparatus which facilitate improved adaptation to differing production requirements.

SUMMARY OF THE INVENTION

This problem is solved, for a processing apparatus of the type described above, by the present invention. Here it is provided that the component mounting of the conveyor is located in a second circle segment shaped surface section, which supplements the first surface section determined by the circular orbit section shaped conveyance path to make a full circle. In this way it is possible for the component mounting, which may be designed for provision and/or removal of components, to be mounted on the processing apparatus in a space-saving manner in such a way that it may be supplied with new components and/or relieved of waste components independently of the operating devices. As a result, the operating sequences at the processing apparatus may be improved since the relevant design of the processing apparatus presets a separation into a processing area in which observation duties are performed by a machine operator, and a supply and disposal area in which supply to and removal from the processing apparatus takes place. This is of special importance if the processing apparatus is intended for integration in a production line, designed for example for the production of aerosol cans or tubes of plastic or metal material. In such a production line is advantageous if all production machines are accessible from the front to a machine operator who is responsible for ensuring stable production processes with the desired product quality. Maintenance, supply and disposal on the other hand should take place along the entire production line from a rear side facing away from the front, to avoid any interference with the production process in conducting the necessary activities, for example the bringing in of components to be processed and the removal of components for disposal. Usually the operating devices are so arranged on the machine bed that the container blanks and in particular their longitudinal axes aligned radially outwards cover an angular range of around 180 degrees to around 330 degrees during the rotary step movement of the rotary worktable between the feed device and the discharge device. This angular range determines the first circle segment shaped surface section and faces the front of the processing apparatus. Consequently the second surface section covers an angular range between around 180 degrees and 30 degrees and faces the rear of the processing apparatus.

Advantageous developments of the invention are set out in the dependent claims.

It is expedient if a rotation axis of the rotary worktable is aligned in the vertical direction, which simplifies the structure of the processing apparatus, in particular the construction of the machine bed. This is due to the fact that the support of the rotary worktable with a vertically aligned rotation axis may be effected with equal precision and with simpler means, because of the lightened support of the weight of the rotatably mounted rotary worktable.

Preferably the longitudinal axes of the locating devices attached to the rotary worktable determine at least one plane of conveyance for the container blanks which is normal to the rotation axis. The longitudinal axes of the locating devices preset the alignment of the longitudinal axes of the container blanks to be located on the locating devices. Preferably the longitudinal axes are aligned in the radial direction normal to the rotation axis of the rotary worktable, or parallel to this radial direction. This simplifies the integration in a production line of a processing apparatus designed in this way, in which the container blanks are usually conveyed with a horizontally aligned container longitudinal axis. In the handover of the container blanks from the upstream conveying device to the feed device and from there to the locating device, no swiveling of the container longitudinal axis into a vertical direction is necessary. In like manner, this applies to the handover of the container blanks from the rotary worktable to the discharge device and the downstream conveying device. So far as is necessary, the locating devices may be designed for temporary, translational shifting of the container blanks in the vertical direction parallel to the rotation axis, in order for example to facilitate advantageous positioning of the container blanks with respect to differently shaped operating devices. In this case, several planes of conveyance are determined by the longitudinal axes of the locating devices.

Preferably the conveyor section between the component mounting and an assigned operating device is at least in certain areas arranged in a conveyor plane parallel to the plane of conveyance and/or intersects the plane of conveyance and/or overlaps the rotary worktable at least almost completely. It is therefore possible to ensure a compact arrangement of the component mounting on the processing apparatus, together with an advantageous material flow to the assigned processing device and/or from the assigned processing device.

It is advantageous if the machine bed, in a cross-sectional plane aligned normal to the rotation axis, has at least in certain areas a circle segment shaped cross-section, in particular semicircular, and/or a maximum width of 2.4 m. With such a cross-section and with an advantageous radial arrangement of the operating devices around a section of the rotary worktable, a compact design of the machine bed is obtained and an advantageous accessibility to the operating devices for adjustment, setting-up, monitoring and maintenance purposes is ensured. This is especially the case when the machine bed has in parts a semicircular cross-section, with a radius of this semicircular cross-section being chosen to be greater than the radius of the rotary worktable by the radial extent of the operating devices, and with both radii arranged concentric to one another. Adjacent to the semicircular cross-section is for example a square or rectangular section, at least one edge length of which corresponds to the radius of the semicircular cross-section of the machine bed.

In a development of the invention it is provided that the feed device and/or the discharge device have a rotary table with its axis of rotation aligned parallel to the rotation axis and to which holding fixtures for container blanks are attached, in particular in a star-shaped arrangement relative to the axis of rotation. With the aid of the rotary table, a change in the orientation of the longitudinal axis of the container blanks, in particular by 180 degrees, is obtained. By this means the container blanks may be handed over reliably from an upstream conveying device to the locating device or from the locating device to a downstream conveying device. Preferably the holding fixtures are designed to grip the container blanks at an end section in order to pull them off the upstream conveying device along the longitudinal axis of the container blanks, and to slip them on to the locating device, and/or to remove them from the locating device along the longitudinal axis of the container blanks and to slip them on to or place them on a downstream conveying device.

An advantageous development of the invention provides that the locating device comprises a rotatably mounted locating mandrel which is connected to the assigned drive unit and is designed for rotation of the container blanks around a horizontally aligned longitudinal axis. This facilitates rotation of the container blank relative to a working appliance, in particular a tool, of an operating device located opposite. Rotation of the container blanks may be continuous or discontinuous. Continuous rotation may be provided for example for processing the entire circumferential surface of the container blank, for example in connection with a coating or drying operation, or a cutting process. On the other hand discontinuous rotation is provided for a screwing-on operation or local processing of the container blank. Where applicable the locating device is equipped with a sensor system designed to detect a rotary position of the container blank. After detection of the rotary position, the container blank may be rotated to bring it into the correct position relative to a working appliance, followed by an appropriate localised work process on the container blank.

Preferably the drive unit of the locating device is in the form of a direct drive, in particular an electric synchronous servomotor, and includes a drive shaft connected to the locating mandrel in one piece or via a clutch device, in particular a hollow shaft conical clutch. In the case of a direct drive, this may involve a pneumatic, hydraulic or electrical rotary drive, in which the drive shaft is connected to the locating mandrel without the interposition of a gear mechanism. Here the locating mandrel and the drive shaft may be made in one piece. Preferably provided for connecting the locating mandrel to the drive shaft is a clutch device which makes it possible to replace the locating mandrel, for example to facilitate adaptation of the locating device to container blanks of different dimensions. Especially preferred is for the clutch device to be in the form of a hollow shaft conical clutch, in particular conforming to DIN 69893, since by this means a torque-resistant and low-play connection of the locating mandrel to the drive shaft may be effected.

In a further development of the invention, the rotary worktable and the feed device and/or the discharge device are each assigned a drive unit for the provision of a rotary movement. This creates the possibility of setting the movable components of the processing apparatus in motion independently of one another and without positive coupling. This facilitates optimisation of the movements of the rotary worktable, the locating devices and the feed and/or discharge devices depending on the particular processes to which the container blanks are being fed.

It is expedient in this connection if the drive units are connected to a control unit designed for independent, in particular synchronised, control of the rotary movements of the drive units. The control unit thus facilitates free design of the movement sequences of the rotary step movement of the rotary worktable, the continuous or discontinuous rotation of the locating mandrels of the locating device and the rotation of the feed and/or discharge device. Preferably these movements are synchronised with one another.

Preferably at least one drive unit for a locating device is assigned a power module associated with the control unit and mounted on the rotary worktable. The power module serves to influence the electrical energy flow and is controlled by the control unit using a suitable control signal. The attachment of the power module to the rotary worktable simplifies the wiring between the power module and the locating device. It is also sufficient if only a single electrical energy flow for all locating devices needs to be fed via a rotary connection. The control signals from the control unit may be transmitted to the power modules over control lines and/or via an optical data link or a radio link, also in particular within the framework of a presettable bus protocol. In the case of feedback control of the drive units, bi-directional communication between control unit and the assigned power module may also be provided via at least one of the types of transmission named above.

In an advantageous development of the invention, the rotary worktable is assigned a centrally located, multipole electrical rotary connection, which is designed to provide electrical supply energy and control signals from the control unit to the power modules of the locating devices. Through this rotary connection, transmission of the electrical supply energy and control signals to the power modules from the control unit which is stationary on the machine bed is effected. As an example, the rotary connection may be a combination of a slipring assembly and assigned contact brushes. In an alternative embodiment, the control unit is decentralised, so that a first part of the control unit, provided for control of the drive unit of the rotary worktable and the operating devices attached immovably to the machine bed, is also attached immovably, in particular to the machine bed. A second part of the control unit is on the other hand attached to the rotary worktable and connected directly to the power modules. Communication between the first and second parts of the control unit is ensured either by wire over the rotary connection, or wirelessly via an optoelectronic and/or radio-electronic connection. Since the two parts of the control unit may each operate independently, it is necessary only to transmit trigger signals to ensure the desired coordinated movement of all drive units.

Preferably the operating devices are designed to provide at least one of the functions of positioning, separating, joining, fitting, reshaping, pressing-in, monitoring, coating, drying, or surface activation. For example, one operating device is designed for cutting a surface area, in particular an end section of a container blank, using a contact or non-contact separating process, for example a cutter or a laser beam. In addition or alternatively, the operating device is designed to join a component to the container blanks, for example by laser welding, ultrasonic welding, hot sealing or friction welding. The operating device may additionally or alternatively be designed to reshape the container on a part of its area or over its entire circumferential surface, in particular to provide localised stamping. The operating device may also be set up to fit a component such as a screw closure to the container blank, and/or to check the container blanks, for example in respect of the quality of any coating or printing and/or the position of a fitted component. The operating device may also be designed for coating the container, in particular for printing, and/or for drying of an applied coating, in particular through heat or ultraviolet radiation, and/or for surface activation before carrying out a joining or coating process, for example by flame treatment of the surface of the container blank.

The problem of the invention is solved according to a second aspect by the features of the present invention, which provide a method for the operation of a processing apparatus according to the present invention, comprising the following steps: control of the drive unit of the rotary worktable by a first control signal to make a rotary step movement to a freely selectable rotary step time with freely selectable rotary step angle, control of a drive unit of at least one processing device to a freely selectable processing time, control of a drive unit for the feed device and/or the discharge device to a freely selectable handover time.

BRIEF DESCRIPTION OF THE DRAWINGS

An advantageous embodiment of the invention is shown in the drawing in which.

DETAILED DESCRIPTION OF THE INVENTION

Figure 1:
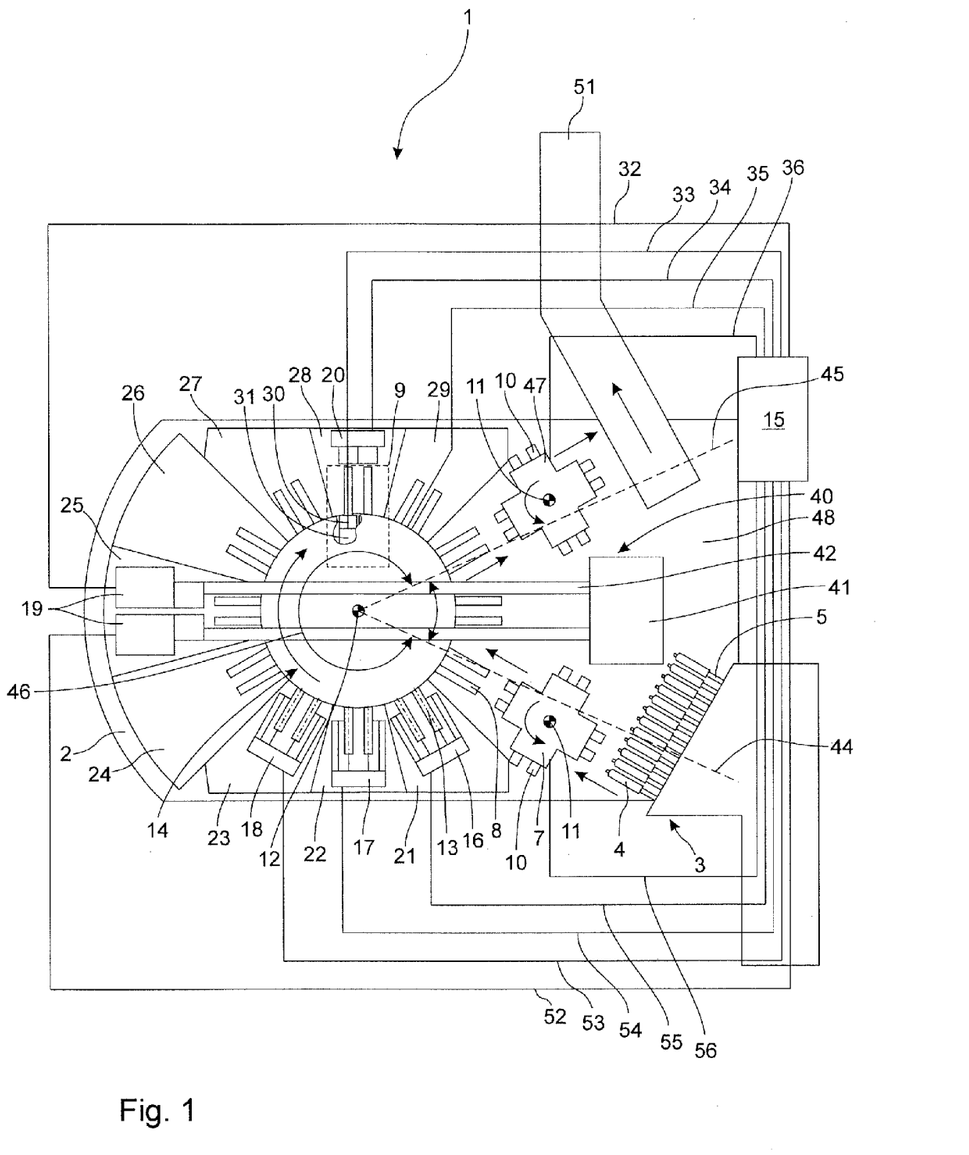
FIG. 1 gives a schematic top view of a processing apparatus designed for integration in a production line for the manufacture of aerosol cans FIG. 2 gives a sectional view of a drive unit for a locating mandrel of the locating device, and FIG. 3 gives a perspective view of a specific embodiment of the processing apparatus according to FIG. 1.

FIG. 1 shows in schematic form a processing apparatus 1 for the processing of container blanks such as for example can blanks for aerosol or drinks cans or tube blanks, which may be made of metal or plastic or of composite materials, for filling with paste-like contents. In the packaging industry such a processing apparatus 1 is also described as a screwing-on machine, since one of the typical applications for a process involving the container blank is the fitting on of a screw closure.

The processing apparatus 1 includes a machine bed 2 which carries the components of the processing apparatus 1 described in detail below, and is provided for setting up on a surface, preferably smooth and not shown in detail, for example on a factory floor. By way of example the machine bed 2 is in the form of a welded construction of tubes and panels, not shown in detail.

Figure 2:
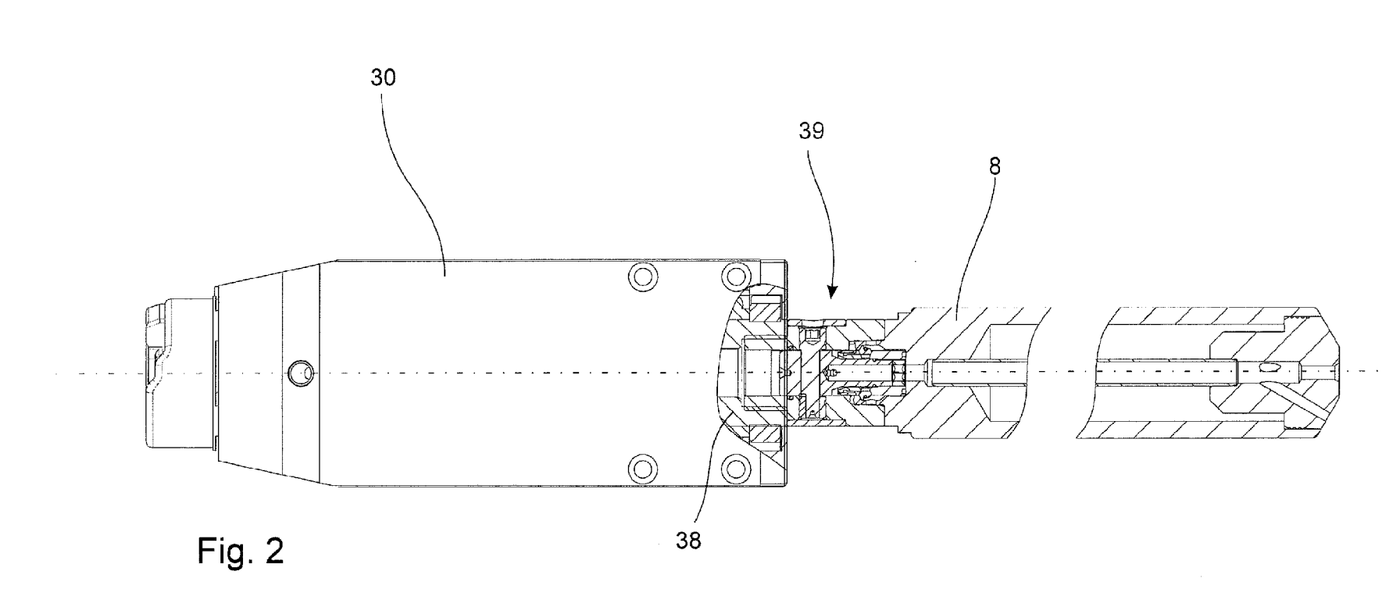

Adjacent to the machine bed 2 is an upstream conveying device 3, for the feeding of container blanks 4, which is in the form of a chain conveyor with a multiplicity of support pins 5 attached to a continuously moving conveyor chain 6 which may be discerned in FIG. 2. The upstream conveying device 3 fetches the container blanks 4 from a production machine located upstream in the production sequence, and makes them available to the processing apparatus 1. Here the container blanks 4 are pushed on to support pins 5 and made available by the upstream conveying device 3 to a feed device 7.

The container blanks 4 are by way of example tube blanks which are substantially hollow-cylindrical in form, with a tapering closure section with integral threaded section at a first end, and a circular filling hole at the second end. The container blanks 4 are pushed on to the support pins 5 in such a way that the closure section faces away from the upstream conveying device 3. The feed device 7 serves to detect the container blanks 4 at the first end, to remove them from the support pins 5 and, after carrying out a swiveling movement, to push them on to locating mandrels 8 of a locating device 9. By way of example, the locating mandrels 8 of the locating device 9 are in each case aligned parallel in pairs, so that also in each case two container blanks 4 may be pushed on to the locating mandrels 8 by a translational movement between feed device 7 and locating device 9.

For this purpose the feed device 7 has gripping means 10 also arranged in pairs and designed to grip the first end of the container blanks 4. They may be moved parallel to the support pins 5 or locating mandrels 8 arranged opposite, in order to be able to perform the desired removal and pushing-on operations. The feed device 7 may be rotated by means of a drive unit, not shown in detail, around an axis of rotation 11 normal to the plane of presentation of FIG. 1. The axis of rotation 11 is indicated by a suitable symbol in FIG. 1. The preferred direction of rotation for the feed device 7 is indicated in FIG. 1 by an arrow.

The locating devices 9 are accommodated on a rotary worktable 14 which is in turn mounted rotatably on the machine bed 2, while a rotation axis 12 of the rotary worktable 14 is aligned normal to the plane of presentation of FIG. 1 and parallel to the axis of rotation 11 of the feed device 7. The rotary worktable 14 is for example in the form of a rotor, preferably designed as a torque motor, of an electric motor not shown in detail. Through the provision of electrical energy, and also where applicable suitable control signals from a control unit 15 attached by way of example to the edge of the machine bed 2, to this electric motor, the latter is set in particular into a pulsed rotary step movement, preferably with a presettable rotary step interval and/or a presettable acceleration curve for the rotary step movements to be made. Consequently the container blanks 4 to be processed may be positioned in the course of the rotary step movement in each case opposite operating devices 16 to 20 attached to the radial outside of the machine bed 2.

In the case of the processing apparatus 1 depicted in FIGS. 1 and 2, by way of example five operating devices 16 to 20 are attached. Depending on the requirements for processing the container blanks 4, up to nine different operating devices may be attached to support plates 21 to 29, on the processing apparatus 1 shown as an example, which may each be fixed to the machine bed 2 and easily interchanged.

To carry out the processing operations at the operating devices 16 to 18 it is advantageous if the locating mandrels 8 can each be rotated around a longitudinal axis 13. For this purpose, inside the locating device 9, each locating mandrel 8 is assigned a drive unit 30, in particular in the form of an electrical synchronous servomotor, by way of example in the form of a direct drive. In the case of a direct drive, the movement energy provided by the drive unit 30 is made available directly to a drive shaft 38 to which the locating mandrel 8 is attached integrally or, as evident from the illustration in FIG. 2, by means of a clutch device 39. The clutch device is by way of example a commercially available hollow shaft conical clutch, in particular conforming to DIN 69893, so that any more detailed description is unnecessary. The clutch device 39 ensures a torque-resistant coupling of the locating mandrel 8, with no play, to the drive shaft 38.

By way of example, each drive unit 30 is assigned a power module 31, shown schematically in FIG. 1, which is connected to the control unit 15 via a control connection 33 and influences the electrical energy flow to the drive unit 30. The control connection 33 is designed for unidirectional receipt of control signals from the control unit 15, or for a bidirectional exchange of control signals and sensor signals, in particular rotary position data, with the control unit 15. By way of example, the control connection 33 may be in the form of a cable connection, as shown in FIG. 1. Additionally or alternatively, data transfer between the control unit 15 and the respective power module 31 may also be provided via a radio link and/or an optical data link. This also applies similarly to the control connections 35, 36, and 56 connecting the rotary worktable 14 and the feed device 7, also the discharge device 47 and the control unit 15.

The power module 31 is also connected, in a manner not shown in detail, to an electrical power supply which facilitates a transfer of electrical energy from the machine bed 2 to the rotatably mounted rotary worktable 14 and the power modules 31 of the drive units 30 attached to the former, via a rotary connection not shown in detail and mounted centrally in the locating device 9. Such a rotary connection may be realised for example by means of one or more sliprings aligned concentrically to the rotation axis 12 and fixed to the machine bed 2 or the rotary worktable 14, and contact brushes lying opposite.

Exemplarily, the operating devices 16 to 20 are also connected via control connections 32, 34, 52, 53, 54, 55 to the control unit 15, so that the control unit 15 is able to influence, in particular coordinate, all movement and processing operations of the processing apparatus 1.

For example the operating devices 16 to 18 form a coating station, at which firstly surface activation involving flame treatment is undertaken by operating device 16. Then, at operating device 17, which is in the form of a printing device, a decor is applied to the container blank 4 or addition is made to an already existing decor in a common printing process, in particular flexographic or inkjet printing. Operating device 18 is in the form of a drying station for the applied decor and comprises exemplarily a light source for emitting ultraviolet radiation to dry the ink.

Operating device 19 is by way of example in the form of a screwing-on station at which the container blanks 4 are provided with screw closures, not illustrated. The screw closures are supplied over a conveyor 40 to the operating device 19, and there fitted to the container blank 4 by means of a linear movement and/or a rotation movement between screw closure and container blank 4. The conveyor 40 includes a component mounting 41 which is exemplarily fixed to the machine bed 2 and serves as a storage container for the screw closures to be fitted. The conveyor 40 also includes a conveyor rail 42 extending transversely over the locating device 9 and serving to convey the screw closures from the component mounting 41 to the relevant operating device 19. The conveyor rail 42 may also include, besides conveying means such as a conveyor belt, not shown, alignments means, also not depicted, which may be used to ensure that the screw closures taken from the component mounting 41 are also fed to the operating device 19 with the correct alignment.

In order to obtain an advantageous spatial arrangement of the component mounting 41 of the conveyor 40, it is mounted to the side of a first circle segment shaped surface section 43, which is delimited by two straight lines 44, 45. These straight lines 44, 45 extend radially outwards from the rotation axis 12 and delimit respectively the area in which a container blank 4 is conveyed along its circular orbit section shaped conveyance path 46 between the feed device 7, the rotary worktable 14 and a downstream discharge device 47 of the processing apparatus 1. The first circle segment shaped surface section 43 is supplemented by a second circle segment shaped surface section 48 to form a circular surface. The location of the component mounting 41 in the area of the second circle segment shaped surface section 48 also makes it possible for the loading and where applicable emptying of components to and/or from the component mounting 41, in particular the screw closures to be processed, to be effected from a rear side 49 of the processing apparatus 1. This avoids interference with the operating sequences at a front side 50 of the processing apparatus 1, where a machine operator carries out mounting, setting, checking and other operations directly related to the processing of the container blanks. Correspondingly, the loading and/or emptying of the component mounting may also take place without interruption from the rear side 49.

After passing the operating device 19, the container blanks 4 are positioned by the rotary worktable 14 and the locating devices 9 attached to it in the course of one or more further rotary step movements at the operating device 20 which, by way of example, is in the form of an optical checking station and which for example checks that the screw closures have been fitted to the container blanks 4 correctly. The container blanks 4 are then handed over to a conveyor belt 51 by means of the discharge device 47 which exemplarily is identical to the feed device 7.

Figure 3:
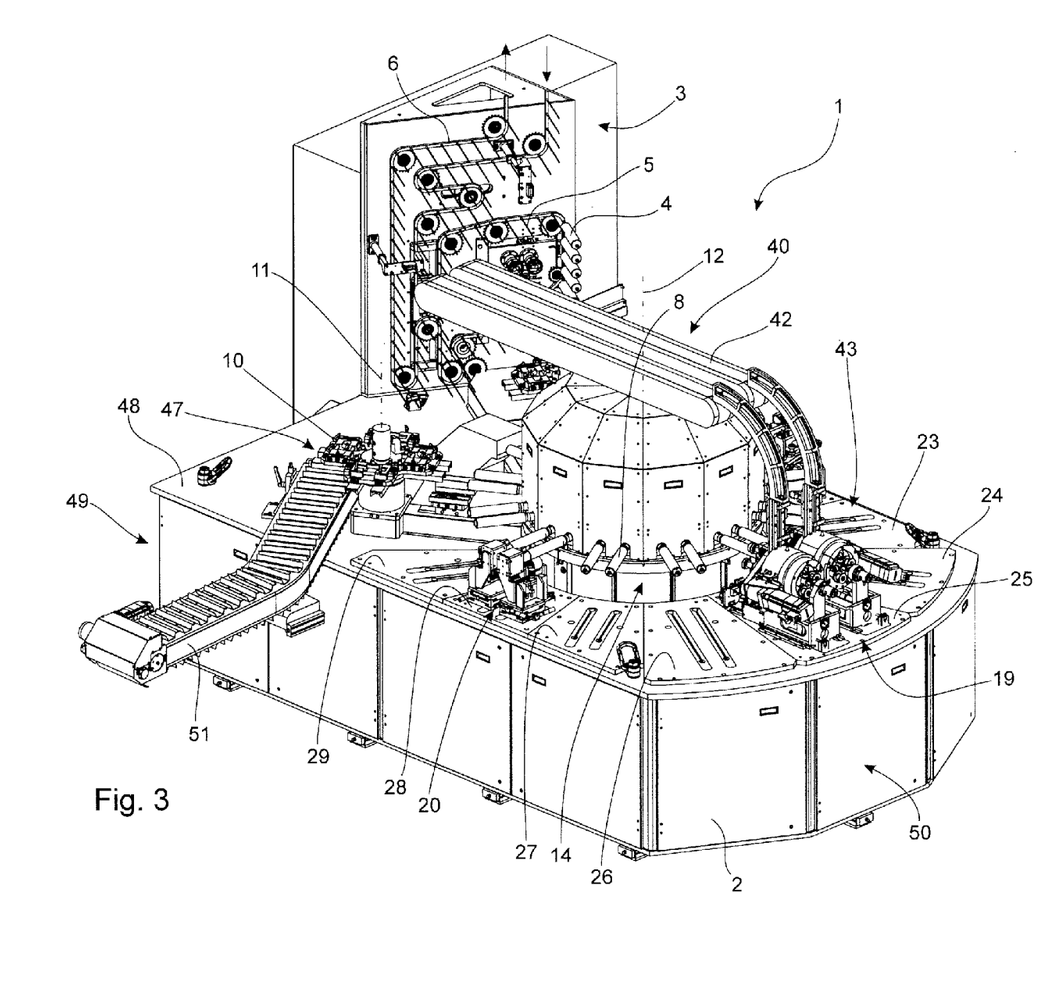

The specific and exemplary design of a processing apparatus 1 may be gathered from FIG. 3, in which the component mounting is not shown for reasons of clarity. In particular FIG. 3 also shows the design of the upstream conveying device 3 as a chain conveyor, the conveyor chain 6 of which is shown only in part, since in practice it extends to an upstream production machine which is not shown. The exemplary direction of conveyance of the conveyor chain 6 is shown by the relevant arrows.

The invention claimed is:

1. A processing apparatus for container blanks, with a machine bed, a feed device for feeding the container blanks, a discharge device for removal of the container blanks, a rotary worktable rotatably mounted to the machine bed about a rotation axis, the worktable having a plurality of locating devices designed for temporary location of the container blanks and for conveyance of the container blanks along a circular orbit section shaped conveyance path between the feed device and the discharge device, wherein the conveyance path determines a first circle segment shaped surface section, a plurality of operating devices lying opposite the rotary worktable in a radial direction extending outward from the rotation axis of the worktable, and which are designed for the processing of the container blanks located on the rotary worktable, and at least one conveyor having a conveyor section designed for conveyance of components of the container blanks from a component mounting to an assigned operating device of the plurality of operating devices, and wherein the component mounting of the conveyor is located in a second circle segment shaped surface section, which supplements the first circle segment shaped surface section determined by the circular orbit section shaped conveyance path to make a full circle.

2. The processing apparatus according to claim 1, wherein the rotation axis of the rotary worktable extends in the vertical direction.

3. The processing apparatus according to claim 2, wherein longitudinal axes of the plurality of locating devices attached to the rotary worktable determine at least one plane of conveyance for the container blanks which is normal to the rotation axis.

4. The processing apparatus according to claim 3, wherein the conveyor section is at least in certain areas arranged in a conveyor plane parallel to the plane of conveyance.

5. The processing apparatus according to claim 2, wherein the machine bed has at least in certain areas a circle segment shaped cross-section and a maximum width of 2.4 m with respect to a cross-sectional plane extending in a direction normal to the rotation axis.

6. The processing apparatus according to claim 2, wherein the feed device and/or the discharge device have a rotary table with an axis of rotation extending parallel to the rotation axis and to which holding fixtures for the container blanks are attached.

7. The processing apparatus according to claim 6, wherein the holding fixtures for the container blanks are in a star-shaped arrangement relative to the axis of rotation.

8. The processing apparatus according to claim 1, wherein each of the plurality of locating devices comprises a rotatably mounted locating mandrel, which is connected to an assigned drive unit and is designed for rotation of the container blanks around a longitudinal axis extending in the horizontal direction.

9. The processing apparatus according to claim 8, wherein the drive unit of each of the plurality of locating devices is in the form of a direct drive and includes a drive shaft connected to the locating mandrel in one piece or via a clutch device.

10. The processing apparatus according to claim 9, wherein the drive unit of each of the plurality of locating devices is an electric synchronous servomotor, and wherein the clutch device comprises a hollow shaft conical clutch.

11. The processing apparatus according to claim 9, wherein the drive unit of each of the plurality of locating devices is connected to a control unit designed for independent control of the rotary movements of the drive units.

12. The processing apparatus according to claim 11, wherein at least one drive unit is assigned a power module associated with the control unit and mounted on the rotary worktable.

13. The processing apparatus according to claim 12, wherein the rotary worktable is assigned a centrally located, multipole electrical rotary connection, which is designed to provide electrical supply energy and control signals from the control unit to the power module.

14. The processing apparatus according to claim 1, wherein the rotary worktable and the feed device and/or the discharge device are each assigned a drive unit for the provision of a rotary movement.

15. The processing apparatus according to claim 1, wherein the operating devices are designed to provide at least one of the functions of positioning, separating, joining, fitting, reshaping, pressing-in, monitoring, coating, drying, or surface activation.

16. A method for operating the processing apparatus according to claim 7 comprising:
    controlling a drive unit of the rotary worktable by a first control signal to make a rotary step movement to a freely selectable rotary step time with freely selectable rotary step angle;
    controlling a drive unit of at least one of the plurality of operating devices to a freely selectable processing time; and
    controlling a drive unit for the feed device and/or the discharge device to a freely selectable handover time.

17. A processing apparatus for container blanks, the processing apparatus comprising:
    a machine bed;
    a feed device supported by the machine bed for feeding the container blanks;
    a discharge device supported by the machine bed for removal of the container blanks;
    a rotary worktable rotatably mounted to the machine bed about a rotation axis;
    a plurality of locating devices supported on the worktable for temporary location of the container blanks, wherein rotation of the worktable conveys the container blanks along a circular orbit section shaped conveyance path between the feed device and the discharge device, wherein the conveyance path determines a first circle segment shaped surface section;
    a plurality of operating devices supported by the machine bed opposite the rotary worktable in a radial direction extending outward from the rotation axis of the worktable, each operating device designed for the processing of the container blanks located on the rotary worktable;
    a component mounting fixed to the machine bed for storing components of the container blanks, the component mounting being located in a second circle segment shaped surface section, the second circle segment shaped surface section supplementing the first circle segment shaped surface section determined by the circular orbit section shaped conveyance path to make a full circle; and at least one conveyor having a conveyor rail extending between the component mounting and an assigned operating device of the plurality of operating devices for transporting the components of the container blanks from the component mounting to the assigned operating device.

\* \* \* \* \*